United States Patent
Shiozawa et al.

(10) Patent No.: US 7,965,590 B2
(45) Date of Patent: Jun. 21, 2011

(54) OPTICAL DISC APPARATUS AND OFFSET ADJUSTMENT METHOD THEREOF

(75) Inventors: Manabu Shiozawa, Yokohama (JP); Takahiro Kurokawa, Fujisawa (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 511 days.

(21) Appl. No.: 12/057,744

(22) Filed: Mar. 28, 2008

(65) Prior Publication Data

US 2008/0304375 A1  Dec. 11, 2008

(30) Foreign Application Priority Data

Jun. 6, 2007  (JP) .................................. 2007-149879

(51) Int. Cl.
*G11B 7/135* (2006.01)

(52) U.S. Cl. ............... 369/44.23; 369/44.37; 369/44.35; 369/44.41; 369/120

(58) Field of Classification Search ............... 369/44.23, 369/44.35, 44.41, 120
See application file for complete search history.

(56) References Cited

U.S. PATENT DOCUMENTS

| | | | |
|---|---|---|---|
| 6,621,775 B1 * | 9/2003 | Nemoto | 369/44.37 |
| 6,654,323 B2 * | 11/2003 | Takasaki et al. | 369/44.41 |
| 7,023,767 B2 * | 4/2006 | Wu et al. | 369/44.29 |
| 7,298,675 B2 * | 11/2007 | Hong et al. | 369/44.37 |
| 2002/0154583 A1 * | 10/2002 | Mashimo | 369/44.29 |
| 2004/0130984 A1 * | 7/2004 | Maruyama et al. | 369/44.41 |
| 2005/0163000 A1 * | 7/2005 | Nishikawa | 369/44.37 |
| 2008/0205245 A1 * | 8/2008 | Matsubara et al. | 369/112.04 |

FOREIGN PATENT DOCUMENTS

| | | |
|---|---|---|
| JP | 2001-307352 | 11/2001 |
| JP | 2002-230805 | 8/2002 |
| JP | 2003-317274 | 11/2003 |
| JP | 2003-317275 | 11/2003 |

* cited by examiner

*Primary Examiner* — Wayne R Young
*Assistant Examiner* — Linh T Nguyen
(74) *Attorney, Agent, or Firm* — Antonelli, Terry, Stout & Kraus, LLP.

(57) ABSTRACT

An optical disc apparatus includes a laser diode for emitting a laser light, a beam splitter for dividing the laser light into a main beam and sub beam, a main photodetector for detecting the main beam to output a main push-pull signal, a sub photodetector for detecting the sub beam to output a sub push-pull signal, and a subtracter for calculating the main and sub push-pull signals to output a differential push-pull signal, in which an amplification degree of the sub push-pull signal is adjusted so that a DC offset on the differential push-pull signal is adjusted, even in the case where a laser intensity is varied.

14 Claims, 11 Drawing Sheets

OPTICAL DISC APPARATUS AND OFFSET ADJUSTMENT METHOD THEREOF

INCORPORATION BY REFERENCE

The present application claims priority from Japanese application JP2007-149879 filed on Jun. 6, 2007, the content of which is hereby incorporated by reference into this application.

BACKGROUND OF THE INVENTION

The present invention relates to an optical disc apparatus to perform a recording and reproducing by adjusting a DC offset component of a differential push-pull signal.

In these years, digital information has exponentially increased in various fields, and high-capacity recording media have been demanded to record the information. With such demands, a Blue-ray disc (hereinafter, referred to as BD) has been put into practical use and expected in these days.

In the case of BD, a recording track width is made narrower than that of DVD (Digital Versatile Disc) to thereby record micro-marks, so that the BD realizes approximately five times the recording capacity compared with the DVD. However, with the decrease of track width, it is necessary to control laser spot positions in further high accuracy. In the case where an offset is superimposed on a tracking error signal in such a way that a laser spot follows the track, the recording and reproducing are performed at a displaced position from the center of target track. Therefore, the quality of recording and reproducing is remarkably reduced. For the foregoing problem, JP-A-2001-307352 discloses such that "a tracking error signal (DPP signal) is generated from a calculated output of a push-pull signal, and a DC (direct current) offset amount generated in the push-pull signal at photodetectors is canceled every push-pull signal," so that "a high precision tracking servo can be realized on the recording, and a recording density can also be made high."

SUMMARY OF THE INVENTION

However, the offset amount caused by a positional displacement etc. of the photodetector is often varied dependent on a laser power.

In such cases, the laser spot is displaced from the center of track on recording since the offset amount is different in the recording and reproducing, even though an offset adjustment by a certain amount is applied to the laser spot on the reproducing.

An object of the invention is to provide an optical disc apparatus and offset adjustment method of adjusting the offset amount of the tracking error signal, which is varied dependent on the laser power, to thereby perform an appropriate recording and reproducing.

The foregoing object is achieved by scope of claims in the invention, for example. Typical outlines of the invention will be followed briefly, among disclosures in this application.

According to the invention, an optical disc apparatus for performing a tracking control in a push-pull system includes a laser intensity detecting unit and a detecting unit. The detecting unit detects an offset amount for each of a main push-pull signal to be used for the tracking control in the push-pull system, a sub push-pull signal, and a differential push-pull signal obtained from the main push-pull signal and the sub push-pull signal. The optical disc apparatus also includes an adjustment unit that adjusts the offset amount on the differential push-pull signal on the basis of variations of the offset amounts on the main push-pull signal, the sub push-pull signal and the differential push-pull signal in response to a variation of a laser intensity.

According to the invention, the optical disc apparatus can adjust the offset amount of the tracking error signal to therefore provide an appropriate recording and reproducing performance.

The other objects, features and advantages of the invention will become apparent from the following description of the embodiments of the invention taken in conjunction with the accompanying drawings.

DETAILED DESCRIPTION OF THE INVENTION

Hereinafter, embodiments of the invention will be described with reference to the drawings. In the case of optical disc apparatus in the invention, a differential push-pull signal is used as a tracking error signal to perform a recording and reproducing. In the following description, a main push-pull signal is referred to as MPP, a sub push-pull signal is as SPP, and a differential push-pull signal is as DPP.

Further, a signal level in a condition where a light is not incident into a detector is defined as a reference level, and a displacement from the reference level at an amplitude central level is referred to as an offset.

The larger the offset amount on the differential push-pull signal, the lower the recording and reproducing quality becomes. For this reason, it is desirable that the offset amount is ideally adjusted to "0" as close as possible.

First Embodiment

In this embodiment as an example, an amplification degree of the sub push-pull signal is varied so that the offset on the differential push-pull signal is adjusted.

Figure 1A:
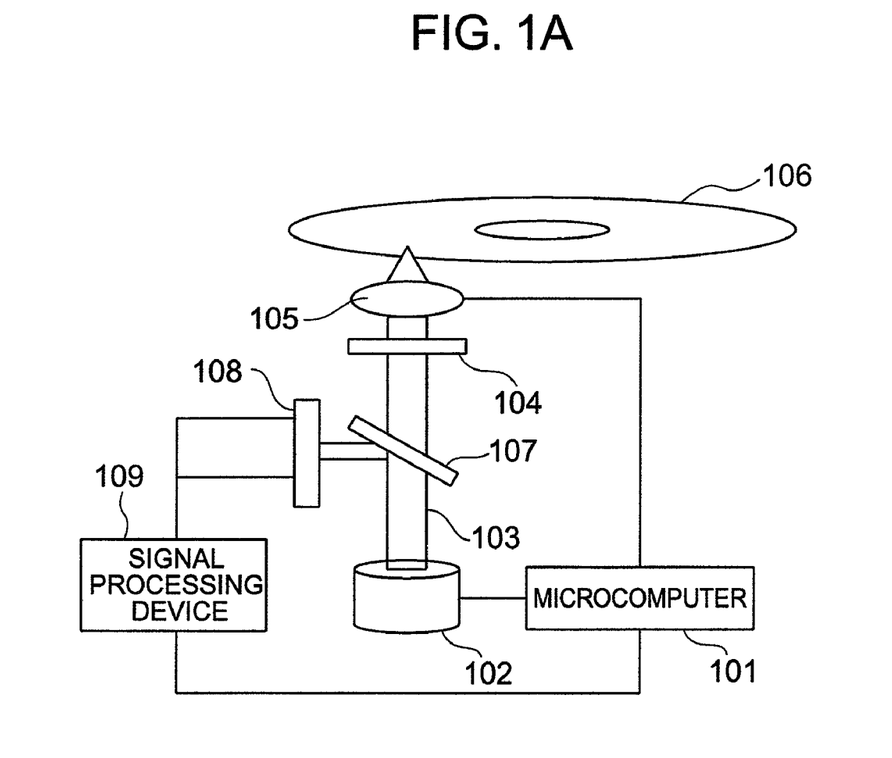
FIG. 1A is a constitutional schematic diagram showing an optical disk apparatus in a first embodiment of the invention.

FIG. 1A is a constitutional schematic diagram showing an example of an optical disc apparatus in the invention. A description for a circuitry which is not directly concerned with the invention is omitted.

A microcomputer 101 drives a laser diode 102. The laser diode 102 emits a laser light 103 having a 400 nm wavelength, for example, in response to a control signal from the microcomputer 101. The laser light 103 is divided into a main beam and a sub beam by a diffraction grating 104.

The laser light is focused on an optical disc 106 by an objective lens 105 to form a main spot and a sub spot. The laser light reflected from the optical disc 106 is converged on a photodetector 108 via a polarization beam splitter 107. The photodetector 108 outputs push-pull waveforms corresponding to the main and sub beams received by itself.

Figure 1B:
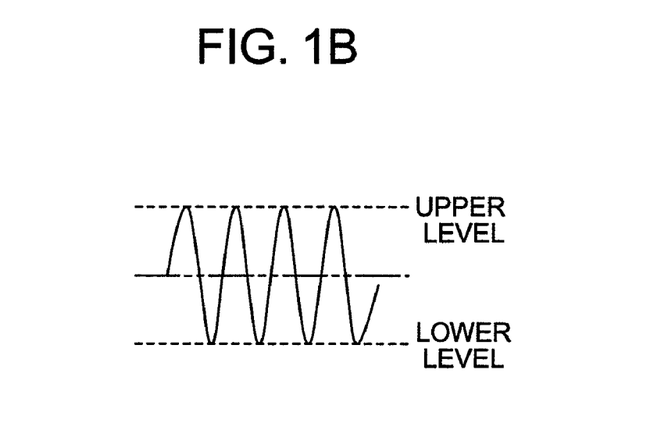
FIG. 1B is an explanatory diagram showing a signal waveform to be occurred in the apparatus.

A signal processing device 109 processes the push-pull waveforms for their amplitudes etc. to then output to the microcomputer 101. As shown in FIG. 1B, the microcomputer 101 detects an upper level and a lower level of an input waveform to calculate a central level of the input waveform. Alternatively, the central level may be detected directly by using a low-pass filter etc. In this case, the low-pass filter may be incorporated in the signal processing device 109, and may also be in the microcomputer 101. The microcomputer 101 also drives the objective lens 105.

In addition, the embodiment has described an example such that the laser light is divided into the two beams by the diffraction grating 104 prior to focusing it on the optical disc 106. However, one laser spot may be focused on the optical disc 106, and the one laser light reflected from the optical disc 106 may be divided by the diffraction grating 104.

Figure 2A:
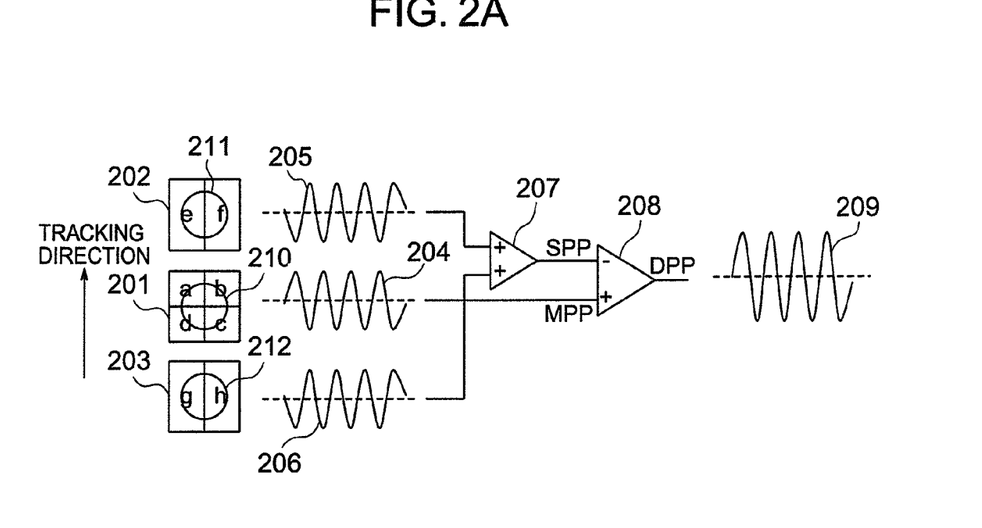
FIG. 2A is a schematic diagram showing that photodetectors receive a laser light to generate a signal DPP.

FIG. 2A is a schematic diagram showing that the photodetector receives the laser light reflected from the optical disc 106 up to generating the DPP signal. A main detector 201 is divided into four segments a, b, c, and d, each of which receives a main spot 210 of the laser light. A calculation (a+d)−(b+c) is executed for the output signals of segments a, b, c, and d to thereby generate the MPP signal 204.

Sub detectors 202 and 203 are divided into two segments ef and gh to thereby receive sub spots 211 and 212, respectively. A calculation (e−f) and (g−h) is executed for the output signals of the segments ef and gh to obtain signals 205 and 206, respectively. A calculation (e−f)+(g−h) is also executed by an adder 207 to generate the SPP signal. As shown in FIG. 2A, the MPP and SPP signals are in opposite phase, because of this, a calculation is applied to the signals MPP and SPP by a subtracter 208 to generate the signal DPP 209. In the case of FIG. 2A, an offset is not occurred on the signal DPP since an offset is not superimposed on the signals MPP and SPP. In this case, the recording and reproducing are not performed with the central track displaced.

Figure 2B:
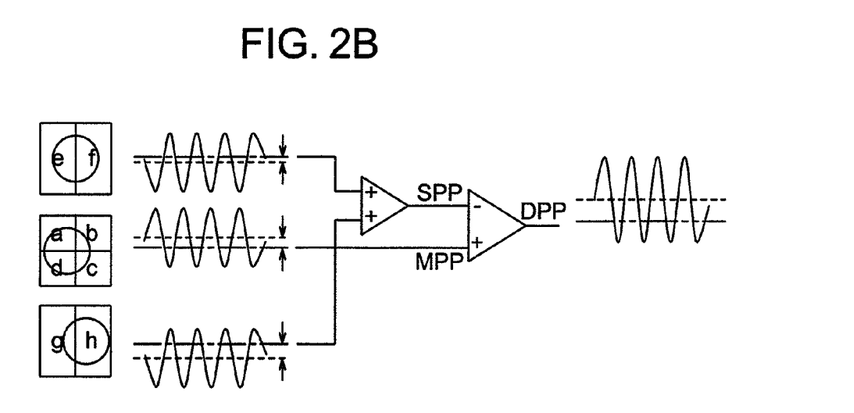
FIG. 2B is another schematic diagram showing that the photodetectors receive the laser light to generate a signal DPP.

In the case of DPP system, there is an advantage that offsets occurred on the signals MPP and SPP can be adjusted at the time of calculating the signal DPP. In this regard, this adjustment is effective only in the case where an offset resides on the signals MPP and SPP by the same amount in the same direction. However, as shown in FIG. 2B, the offset stays in the signal DPP when the offset amount is different in each of the output signals from the photodetectors. This situation occurs in the cases where the respective detectors are displaced from an ideal position, a spot position is displaced when it is focused on the detector by reflecting the laser light from the optical disc 106, and each of the output gains is different from the segments a, b, c and d, and the segments ef, gh. In this case, each of the offset amounts is dependent on the laser power to be received. This power variation occurs in the cases where the laser power is varied when it is emitted from the objective lens 105 of the optical disc apparatus by switching over to the recording or reproducing, a reflectance of the optical disc 106 is varied, an efficiency of an optical system in the optical disc apparatus is varied, etc.

Figure 3A:
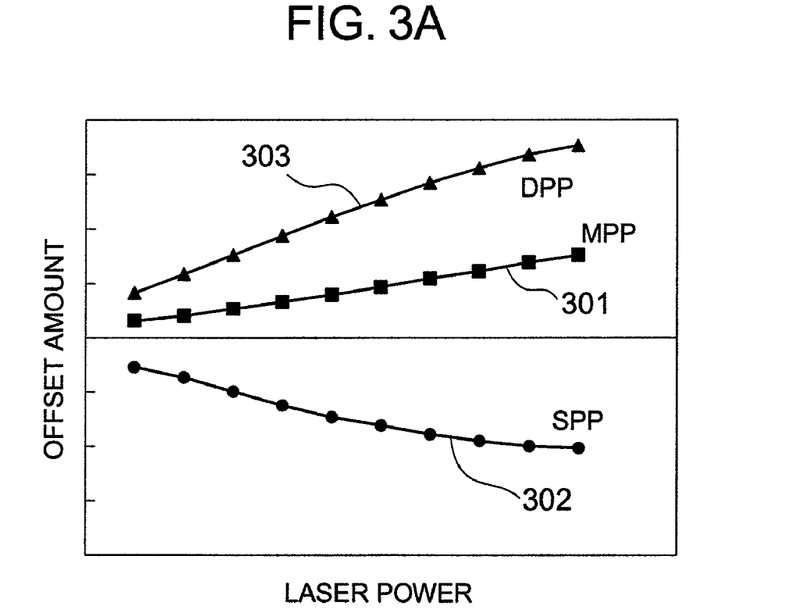
FIG. 3A is an explanatory diagram showing variations of offset amounts on signals MPP, SPP and DPP relative to a laser power.

FIG. 3A is an explanatory diagram showing a power relativity of the offset amounts on the signals MPP 301, SPP 302, and DPP 303. That is, the offset amounts on the signals MPP and SPP increase with increase of the laser power, as a result, the offset amount on the signal DPP 303 also increases dependent on the laser power. In addition, FIG. 3A shows a case where the offset directions are different in the signals MPP and SPP, respectively, but a similar situation as described above occurs if the offset amounts are different, even though both the offsets are toward the same direction.

Figure 3B:
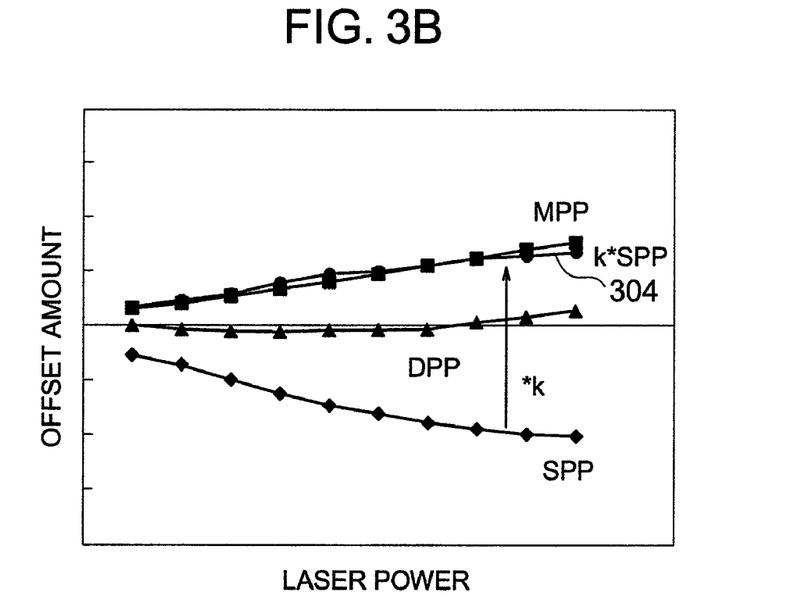
FIG. 3B is another explanatory diagram showing variations of offset amounts on the signals MPP, SPP and DPP relative to the laser power.
Figure 4:
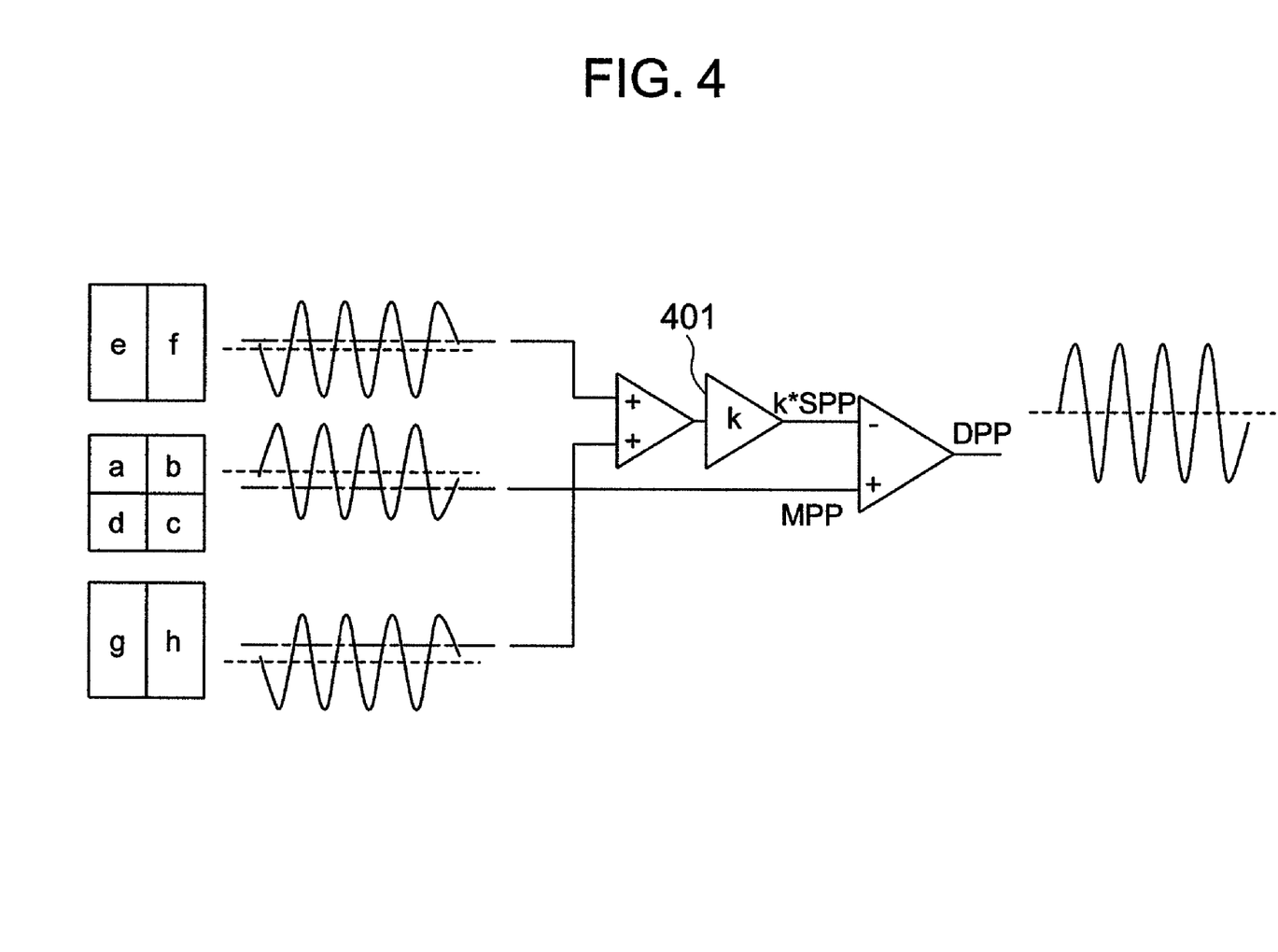
FIG. 4 is an constitutional example of the invention to amplify the signal SPP by an amplifier having an amplification degree k times and adjust the offset on the signal DDP.

FIG. 4 is a constitutional diagram in the invention in which the signal SPP is amplified by an amplifier 401 having an amplification degree of k times. Here, the amplification degree k is varied so that the offset of k*SPP is turned into the same offset on the signal MPP. Therefore, the offset on the signal DPP can be adjusted. An operational expression for generating the signal DPP is specified by DPP=MPP−k*SPP, where k is a negative value in the case of FIG. 3B.

FIG. 3B is an explanatory diagram showing offset amounts on the respective signals MPP, SPP and DPP. The amplification degree k is varied so that the offset amount on k*SPP designated by 304 is varied with the same offset amount on the signal MPP, which can adjust the offset amount on the signal DPP. FIGS. 2A, 2B and 4 show examples where the amplitude resides in the signal SPP, but the amplifier 401 may have a function of the offset adjustment alone, as the signal SPP is a DC signal. Further, the signal MPP may also be used as an offset adjustment signal if an amplitude is provided for the signal SPP alone. In this case, an amplifier may also be provided for varying the amplification degree of the signal MPP.

Figure 5:
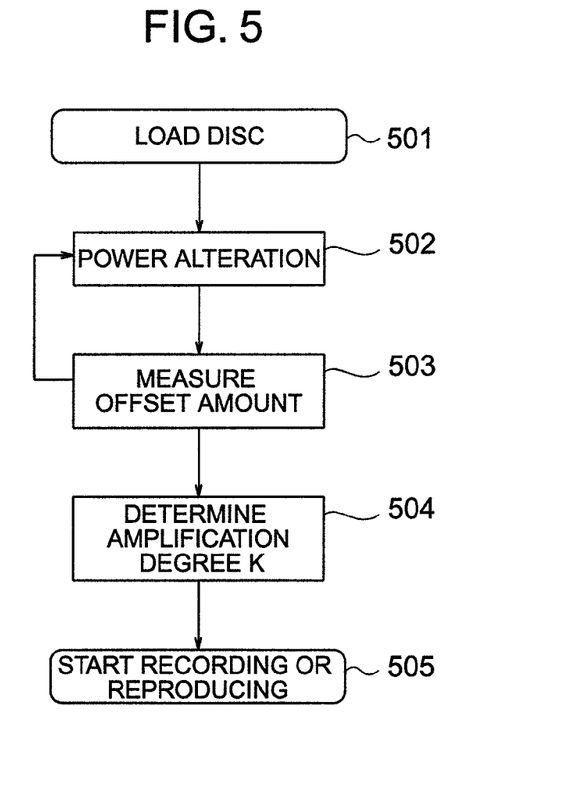
FIG. 5 is a flow chart of a case where the signal SPP is amplified by the amplifier having the amplification degree k times, and the offset on the signal DPP is adjusted.

FIG. 5 is a flow chart of performing the invention. First, in a step 501, the optical disc 106 is loaded on the optical disc apparatus. A laser power is set in a step 502, and the offset amounts on the signals MPP and SPP are measured in a step 503. Subsequently, the steps 502 to 503 are repeated by a necessary number of times to obtain a relation of the offset amount relative to the laser power. The laser power set in the step 502 is a power on the order of incident that is not recorded on the optical disc 106. The recording is desirably performed on a power calibration area since information recorded on the optical disc 106 is protected from deletion. In a step 504, a sensitivity ratio relative to the laser power of the signals MPP and SPP is set to as the amplification degree k, and the recording or reproducing operation is started in a step 505.

Figure 6:
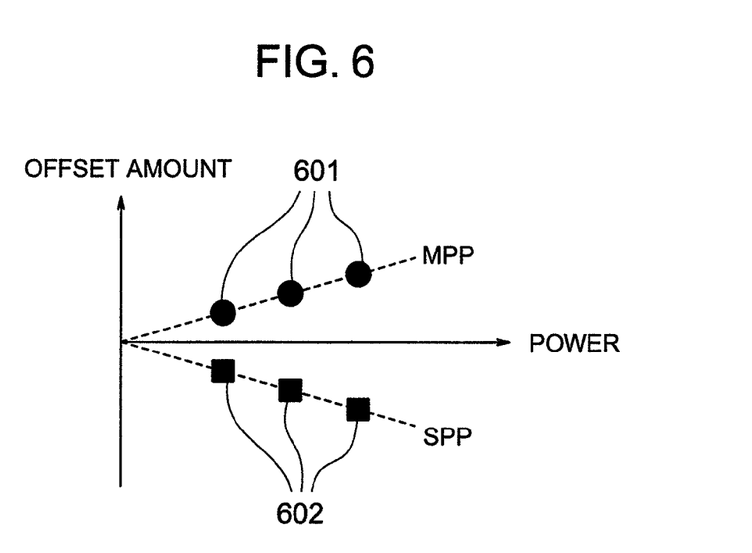
FIG. 6 is an explanatory diagram showing that the offset amounts on the signals MPP and SPP are plotted relative to the laser power.

FIG. 6 is an explanatory diagram showing an operational example in the steps 502 and 503 shown in FIG. 5. Both an offset amount 601 on the signal MPP and an offset amount 602 on the signal SPP are respectively measured in relation to the respective laser powers, so that a sensitivity can be measured for the laser powers of the signals MPP and SPP.

As described above, the amplification degree k of the signal SPP is obtained necessary for adjusting the offset amount on the signal DPP from a relation between a laser intensity and an offset amount on a push-pull signal. The amplification degree of the signal SPP is then varied so that the offset on the signal DPP can be adjusted, and an appropriate recording and reproducing operation can be realized.

Further, in this embodiment, it is possible to adjust the offset on the signal DPP by the amplification degree k which is obtained by the foregoing description, even in the case of either a data read or data write.

Second Embodiment

This embodiment indicates an example of adjusting the offset on the signal DPP by adjusting a position of the objective lens 105 facing to the optical disc 106. Hereinafter, a positional variation of the objective lens 105 is referred to as a "lens shift."

Figure 7A:
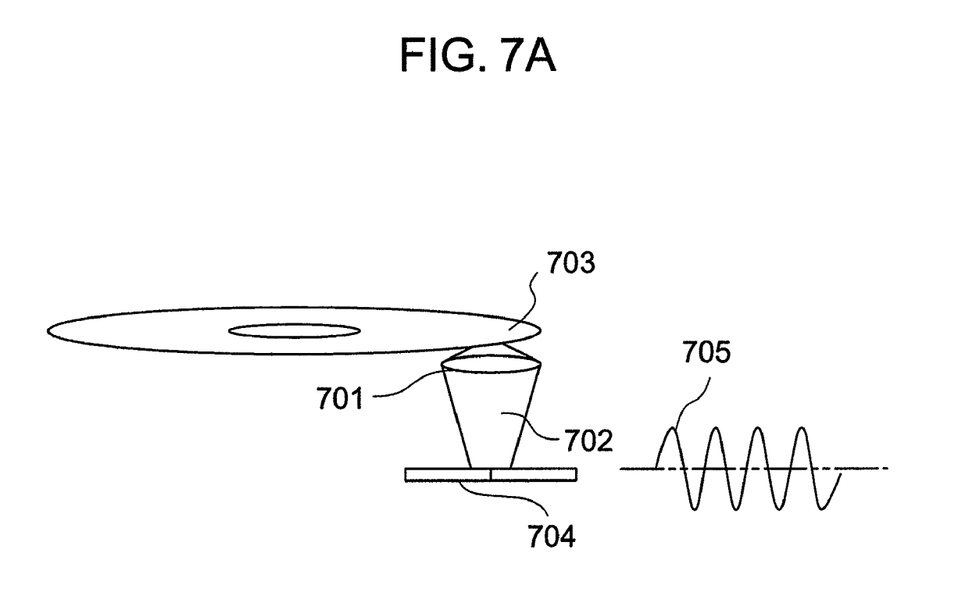
FIG. 7A is a constitutional schematic diagram showing an optical disc apparatus in a second embodiment of the invention.

FIG. 7A is a constitutional schematic diagram of an optical disc apparatus in the second embodiment, in which a laser light 702 focused on an optical disc 703 by an objective lens 701 is reflected from the optical disc 703 to enter into a photodetector 704, thereby outputting a push-pull waveform 705. Here, the push-pull waveform indicates the signal MPP or SPP.

Figure 7B:
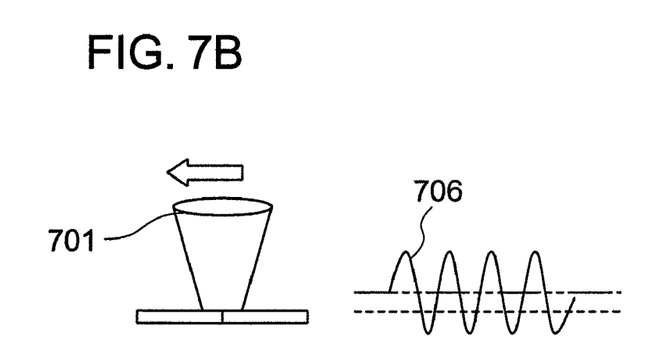
FIG. 7B is an explanatory diagram showing an offset of a push-pull signal relative to a lens shift.

The objective lens 701 and photodetector 704 are mounted on the optical disc apparatus, and the photodetector 704 is divided into two or four segments as shown in FIG. 4. As shown in FIG. 7A, the push-pull waveform 705 does not have an offset if the photodetector 704 is disposed ideally in relation to a laser spot. On the other hand, as shown in FIG. 7B, an offset occurs on a push-pull waveform 706 when the position of objective lens 701 is displaced. In this way, there is a correlation between the position of objective lens 701 and the offset amounts on the signals MPP and SPP, therefore, the offset amount can be controlled by shifting the objective lens 701. The variation of offset amount relative to the variation of the objective lens position depends on the optical system design, that is, the sensitivity is normally altered in the signals MPP and SPP.

Figure 8A:
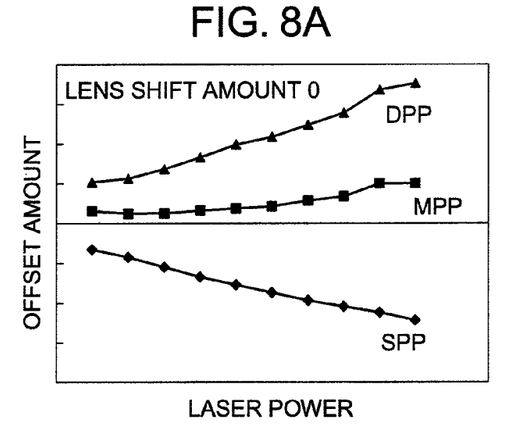
FIG. 8A is an explanatory diagram showing variations of the offset amounts relative to the laser power in the lens shift.
Figure 8B:
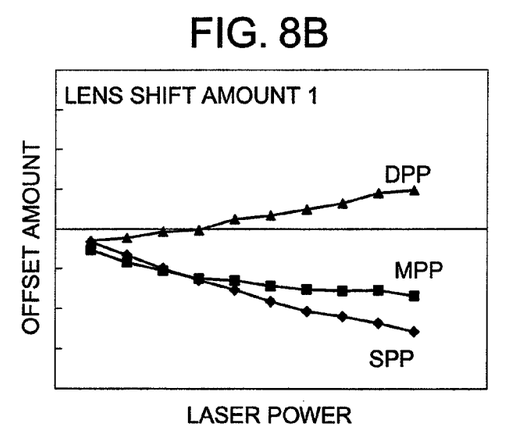
FIG. 8B is another explanatory diagram showing variations of the offset amounts relative to the laser power in the lens shift.
Figure 8C:
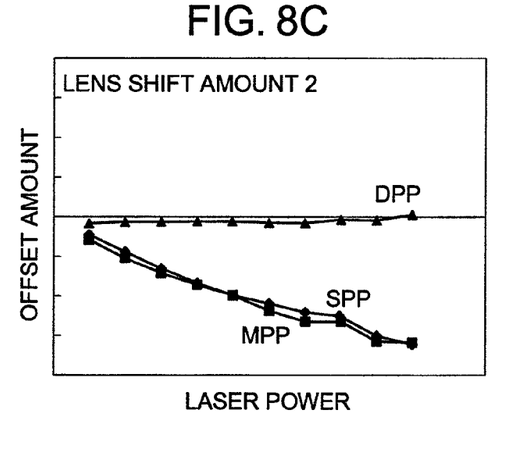
FIG. 8C is still another explanatory diagram showing variations of the offset amounts relative to the laser power in the lens shift.

FIGS. 8A, 8B and 8C show examples of adjusting the offset on the signal DPP by using the foregoing principle. FIG. 8A shows an example where offsets occur on the signals MPP and SPP by causing a positional displacement of the photodetector, a gain distortion, etc. even though the position of objective lens 701 is set to an initial value. FIG. 8B shows a power relativity of the offset amount when the position of objective lens 701 is varied by a certain amount. The variation amount of the signal DPP decreases relative to the laser power since the relativity to the laser power is similar to that of the signals MPP and SPP in comparison with the relativity in FIG. 8A. In the case of FIG. 8C, the offset on the signal DPP is adjusted since the variation of the signal MPP is substantially similar to that of the signal SPP relative to the laser power by applying further the lens shift. This is because the offset variation amount on the signal MPP is different from that of the signal SPP in relation to the lens shift. In the case of FIGS. 8A to 8C, the variation of the signal MPP is larger than that of the signal SPP.

Figure 9:
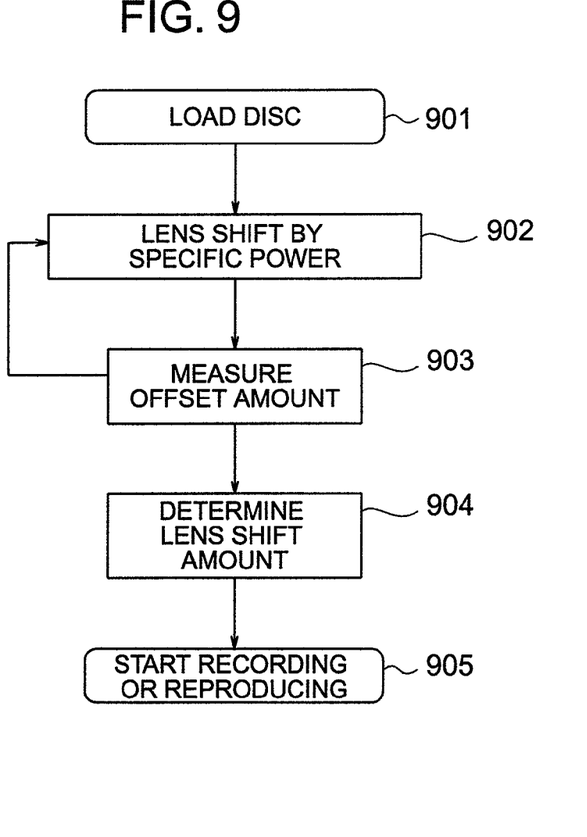
FIG. 9 is a flow chart of a case where the offset on the signal DPP is adjusted by using the lens shift.

FIG. 9 is a flow chart of performing the invention. In a step 901, the optical disc 703 is loaded on the optical disc apparatus. In a step 902, the objective lens 701 is varied by the lens shift with use of the laser power 1 mW, for example. In a step 903, the offset amounts on the signals MPP and SPP are measured respectively. Subsequently, the steps 902 to 903 are repeated until a relation between a lens shift amount and the offset amount is obtained in a necessary precision. In a step 904, the lens shift amount is determined so that the offset on the signal DPP can be adjusted. In a step 905, the recording or reproducing is started by using that lens shift amount. In addition, the offset amounts on the signals MPP and SPP are measured in the steps 902 and 903, however, the offset amount on the signal DPP may be measured first, and the lens shift amount is then obtained so that the offset amount is equal to or less than a range of a certain amount.

Figure 10:
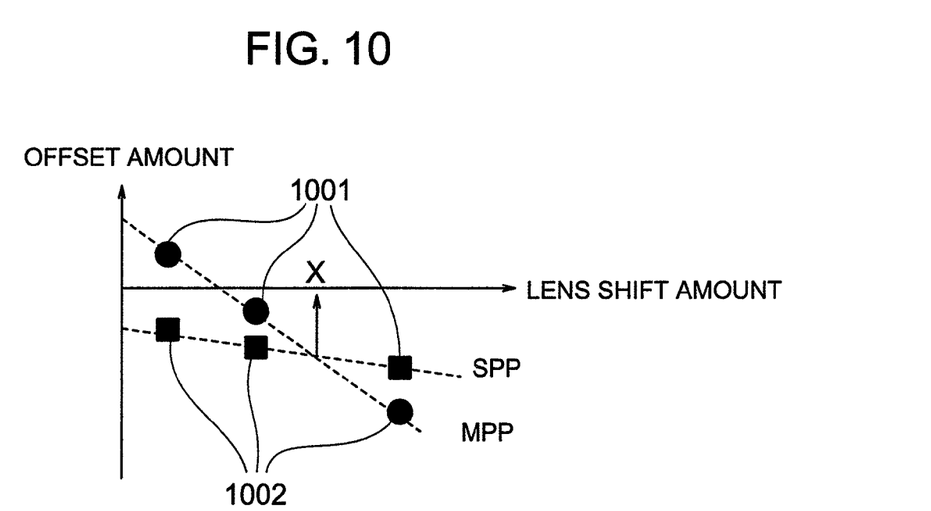
FIG. 10 is an explanatory diagram showing that offset amounts on the signals MPP and SPP are plotted in relation to the lens shift.

FIG. 10 is an explanatory diagram showing the operation in the steps 902 and 903. The lens shift amount is varied, and both an offset amount 1001 on the signal MPP and an offset amount 1002 on the signal SPP are measured so that the sensitivity can be measured for the lens shift of the signals MPP and SPP. A symbol x shown in FIG. 10 is a desirable lens shift amount. In addition, the foregoing operation may be performed by a plurality of laser powers so that the measuring precision is enhanced.

In this way, the position of objective lens 701 is adjusted to adjust the offset on the signal DPP and realize an appropriate recording and reproducing operation.

Third Embodiment

This embodiment indicates an example of adjusting the offset on the signal DPP by varying the amplification degree of the signal SPP and the lens shift in combination. This embodiment is effective when a settable amplification degree of the signal SPP and a lens shift amount are limited to use in the adjustment. That is, the amplification degree is dependent on the specification of circuitry, and the lens shift amount is dependent on a current amount to drive an actuator.

Figure 11A:
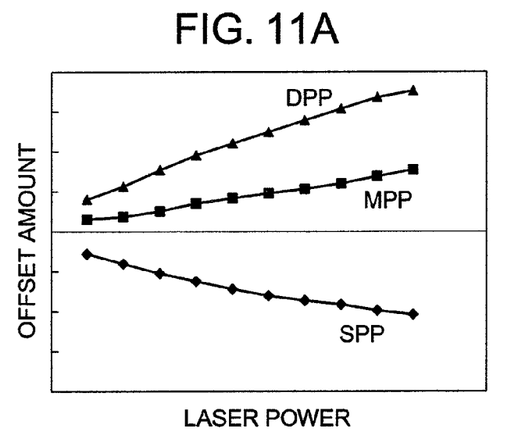
FIG. 11A is an explanatory diagram showing that the lens shift and the amplifier for the signal SPP are used to adjust the offset on the signal DPP.
Figure 11B:
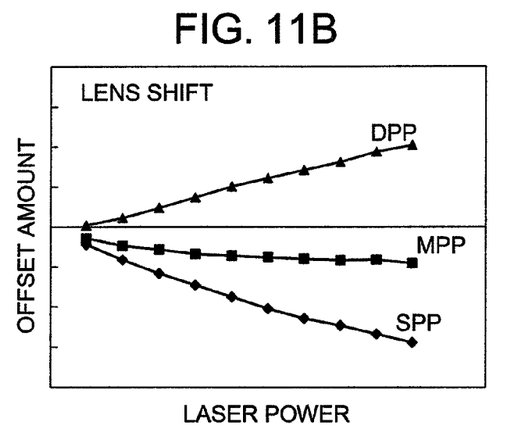
FIG. 11B is another explanatory diagram showing the lens shift and the amplifier for the signal SPP are used to adjust the offset on the signal DPP.
Figure 11C:
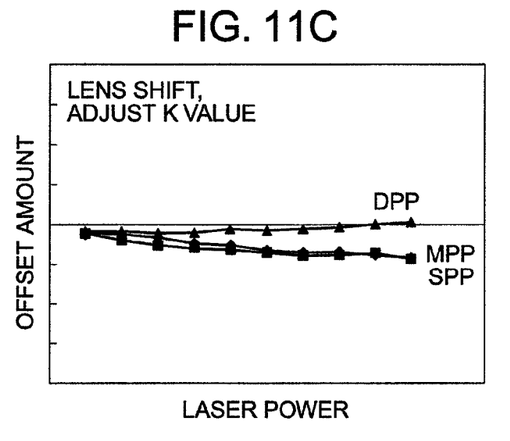
FIG. 11C is still another explanatory diagram showing the lens shift and the amplifier for the signal SPP are used to adjust the offset on the signal DPP.

FIG. 11A shows a laser power relativity of the offset amounts of the respective signals when the alteration for the lens shift and amplification degree is not performed, and shows a condition where the offset on the signal DPP increases with increase of the laser power. FIG. 11B shows that the offset on the signal DDP decreases by performing the lens shift in a certain amount. FIG. 11C shows the laser power relativity when the amplification degree of the signal SPP is adjusted from the condition shown in FIG. 11B, and shows a condition where the laser power relativity of the offset on the signal DPP is adjusted. In the case of FIG. 11A, it is necessary to set the amplification degree k of the signal SPP to a negative value so that the laser power relativity is compensated by the alteration of amplification degree of the signal SPP alone. However, in the case of FIG. 11C, the amplification degree k is a positive value. In this way, the invention is effective even in a case where the symbol of the k value has limitation.

Figure 12:
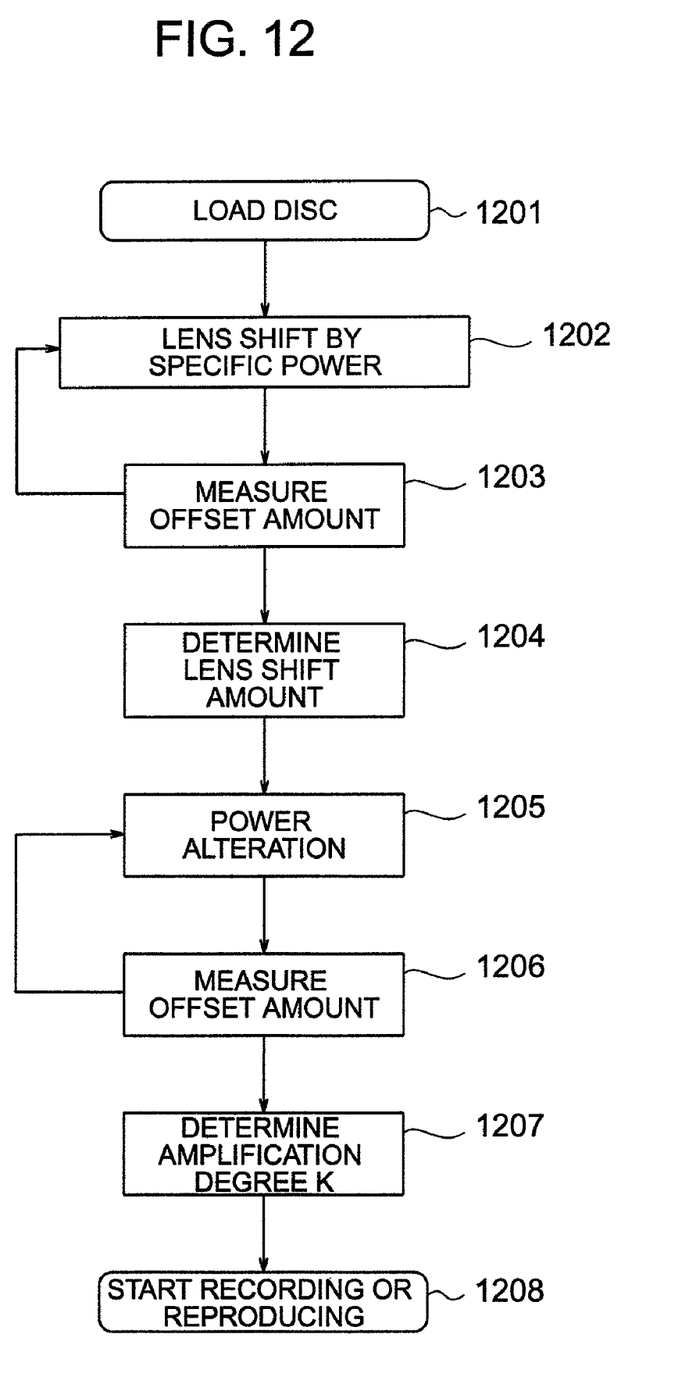
FIG. 12 is a flow chart of a case where the lens shift and the amplifier for the signal SPP are used to adjust the offset on the signal DPP.

FIG. 12 is a flow chart of performing the invention. First, in a step 1201, the optical disc 703 is loaded on the optical disc apparatus. In a step 1202, the objective lens 701 is varied by the lens shift with use of the laser power 1 mW, for example. The offset amounts on the signals MPP and SPP are measured in a step 1203. In a step 204, the lens shift is set to a predetermined value capable of reducing the offset in a movable range, when the offset adjustment for the signal DPP is insufficient in the movable range of the objective lens 701. According to the lens shift amount which is set by the foregoing process, the laser power is altered in a step 1205, and the respective offset amounts on the signals MPP and SPP are measured in a step 1206. Subsequently, the steps 1205 to 1206 are repeated by a necessary number of times to obtain a relation of the offset amount relative to the laser power. In a step 1207, a sensitivity ratio relative to the laser power of the signals MPP and SPP is set to as the amplification degree k, and the recording or reproducing operation is started in a step 1208. In addition, this embodiment indicates an example of the flow chart to determine the lens shift amount first, and then determine the amplification degree of the signal SPP, however, the order of determinations may be turned over.

In this way, the amplification degree of the signal SPP and lens shift are varied in combination to adjust the offset on the signal DPP, therefore, an appropriate recording and reproducing operation can be realized.

Fourth Embodiment

In the case of this embodiment, the offset amount on the differential push-pull signal is adjusted to non-recorded discs by using one of the foregoing first to third embodiments. Thereafter, the variations of the signals and information (hereinafter, referring to tracking compensation information) relative to the optical system are stored in a compensation information storage unit of the optical disc apparatus, in which the variations are of the main push-pull signal, sub push-pull signal, and differential push-pull signal, these being related to the laser intensity calculated by the first to third embodiments; and the information is a lens position, for examples. A nonvolatile memory may be used for the compensation information storage unit. A disc identification code to be written in a PMA (Program Memory Area) may be used for the information for identifying the optical discs, for example.

Figure 13:
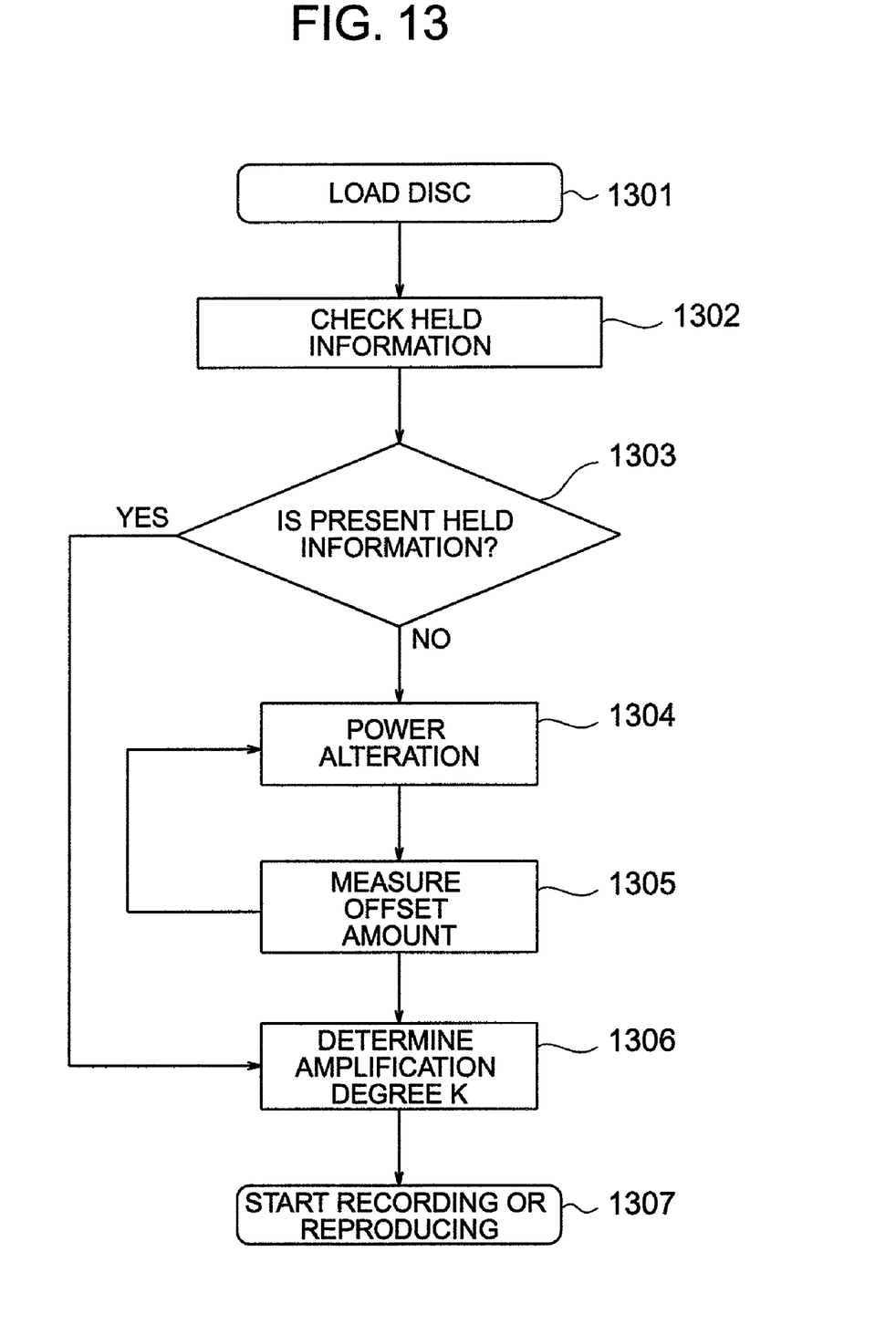
FIG. 13 is a flow chart of a case where the offset on the signal DPP is adjusted when the optical disc apparatus holds tracking compensation information.

FIG. 13 is a flow chart of performing this embodiment. In the case of FIG. 13, it is assumed that the method of the first embodiment is used as a method of obtaining the compensation information. Further, it is also assumed that the identification information and tracking compensation information for a plurality of optical discs are stored in the compensation information storage unit.

First, the optical disc 703 is loaded on the optical disc apparatus in a step 1301. In a step 1302, the process makes sure whether the identification information obtained from the optical disc 703 is stored in the compensation information storage unit. The tracking compensation information of optical disc 703 is stored in the compensation information storage unit if the identification information is stored therein.

In a step 1303, the process transfers to a step 1306 if it is proved that the tracking compensation information of the optical disc 703 presently loaded on the optical disc apparatus is held in the compensation information storage unit. The process transfers to a step 1304 if the tracking compensation information of the optical disc 703 presently loaded thereon is not held therein.

A laser power is set by the step 1304, and offset amounts on the signals MPP and SPP are measured in a step 1305. Subsequently, the steps 1304 to 1305 are repeated by a necessary number of times to obtain a relation of the offset amount relative to the laser power. The laser power set by the step 1304 is a power on the order of incident that is not recorded on the optical disc 703. The recording is desirably performed on a power calibration area since information recorded on the optical disc 703 is protected from deletion. In the step 1306, a sensitivity ratio to the laser power of the signals MPP and SPP is set to as the amplification degree k, and the recording or reproducing operation is started in a step 1307.

In this way, the tracking compensation information is obtained from the compensation information storage unit if the tracking compensation information is held in the compensation information storage unit, and the recording or reproducing operation can be performed. That is, a process for obtaining the tracking compensation information can be omitted, so that the process can be simplified. Further, in the case of optical disc, the tracking compensation information of which is not held in the compensation information storage unit, the tracking compensation information is obtained from one of the methods described in the first to third embodiments to then perform the recording or reproducing operation, so that the appropriate recording and reproducing operations can be realized.

In addition, the compensation information storage unit is provided in the optical disc apparatus in this embodiment, but an exclusively used area may be provided on the optical disc to record the tracking compensation information. The advantage in the invention is also no change in this case.

Further, in the embodiment, the nonvolatile memory is used as a compensation information storage unit, and the disc identification code written in the PMA is used as disc identification information, which is not limited to the invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc apparatus for recording information on an optical disc, comprising:
   a laser diode that emits a laser light;
   a lens that focuses the laser light on the optical disc;
   lens adjustment means that adjusts a position of the lens;
   means that divides the laser light into a main beam and a sub beam;
   means that detects the main beam to output a main push-pull signal;
   means that detects the sub beam to output a sub push-pull signal;
   means that outputs a differential push-pull signal from the main push-pull signal and the sub push-pull signal;
   laser intensity detecting means that detects a laser intensity;
   offset amount detecting means that detects an offset amount for each of the main push-pull signal, the sub push-pull signal, and the differential push-pull signal; and
   adjustment means that adjusts the offset amount on the differential push-pull signal in accordance with a variation of the offset amounts on the main push-pull signal, the sub push-pull signal, and the differential push-pull signal, in relation to the laser intensity;

wherein the laser diode emits the laser light having at least a first laser intensity P1 and a second laser intensity P2 to the optical disc;

wherein the offset amount detecting means detects an offset amount Mof1 on the main push-pull signal and an offset amount Sof1 on the sub push-pull signal in the first laser intensity P1 based on a reflection from the optical disk, and an offset amount Mof2 on the main push-pull signal and an offset amount Sof2 on the sub push-pull signal in the second laser intensity P2 based on a reflection from the optical disk; and wherein the adjustment means varies an amplification degree of the sub push-pull signal in accordance with a variation of the offset amounts on the main push-pull signal and the sub push-pull signal in relation to a variation of a laser intensity derived from the first and second laser intensities P1, P2, the offset amounts Mof1, Mof2, and the offset amounts Sof1, Sof2.

2. The apparatus according to claim 1, wherein the adjustment means adjusts the position of the lens such that a difference between the offset amounts on the main push-pull signal and the sub push-pull signal is present in a predetermined range in a necessary laser intensity for use in at least a reproducing and a recording.

3. The apparatus according to claim 1, wherein the laser diode emits the laser light having at least the first laser intensity P1 and the second laser intensity P2 to the optical disc, the offset amount detecting means detects the offset amount Dof1 on the differential push-pull signal in the first laser intensity P1 based on the reflection from the optical disc, and the offset amount Dof2 on the differential push-pull signal in the second laser intensity P2 based on the reflection from the optical disc, and the adjustment means adjusts the position of the lens such that the offset amount on the differential push-pull signal is present in a predetermined range in a necessary laser intensity for use in at least the reproducing and recording in accordance with a variation of the offset amount on the differential push-pull signal in relation to the variation of the laser intensity derived from the first and second laser intensities P1, P2, and the offset amounts Dof1, Dof2.

4. The apparatus according to claim 1, wherein the sub push-pull signal only has a DC offset component.

5. The apparatus according to claim 1, wherein the adjustment of the offset amount on the differential push-pull signal is performed on loading the optical disc.

6. The apparatus according to claim 1, wherein an area to be irradiated by the laser light for obtaining the variation of the laser intensity and offset amount is a power calibration area.

7. The apparatus according to claim 1, further comprising means that holds the variation of the offset amount on the push-pull signal in relation to the variation of the laser intensity, and disc information storage means that holds information to specify the optical disc.

8. The apparatus according to claim 7, wherein the adjustment means adjusts the information held in the disc information storage means, for specifying the optical disc, and the offset amount on the differential push-pull signal in accordance with the variation associated with the optical disc.

9. An optical disc apparatus for recording information on an optical disc, comprising:
a laser diode that emits a laser light;
a lens that focuses the laser light on the optical disc;
lens adjustment means that adjusts a position of the lens;
means that divides the laser light into a main beam and a sub beam;
means that detects the main beam to output a main push-pull signal;
means that detects the sub beam to output a sub push-pull signal;
means that outputs a differential push-pull signal from the main push-pull signal and the sub push-pull signal;
laser intensity detecting means that detects a laser intensity;
offset amount detecting means that detects an offset amount for each of the main push-pull signal, the sub push-pull signal, and the differential push-pull signal; and
adjustment means that adjusts the offset amount on the differential push-pull signal in accordance with a variation of the offset amounts on the main push-pull signal, the sub push-pull signal, and the differential push-pull signal, in relation to the laser intensity;

wherein the laser diode emits the laser light having at least the first laser intensity P1 and the second laser intensity P2 to the optical disc;

wherein the offset amount detecting means detects the offset amount Mof1 on the main push-pull signal and the offset amount Sof1 on the sub push-pull signal in the first laser intensity P1 based on the reflection from the optical disc, and the offset amount Mof2 on the main push-pull signal and the offset amount Sof2 on the sub push-pull signal in the second laser intensity P2 based on the reflection from the optical disc; and wherein the adjustment means adjusts the position of the lens such that a difference between the offset amounts on the main push-pull signal and the sub push-pull signal is present in a predetermined range in a necessary laser intensity for use in at least a reproducing and recording in accordance with a variation of the offset amounts on the main push-pull signal and the sub push-pull signal in relation to the variation of the laser intensity derived from the first and second laser intensities P1, P2, the offset amounts Mof1, Mof2, and the offset amounts Sof1, Sof2.

10. An optical disc apparatus for recording information on an optical disc, comprising:
a laser diode that emits a laser light;
a lens that focuses the laser light on the optical disc;
lens adjustment means that adjusts a position of the lens;
means that divides the laser light into a main beam and a sub beam:
means that detects the main beam to output a main push-pull signal;
means that detects the sub beam to output a sub push-pull signal;
means that outputs a differential push-pull signal from the main push-pull signal and the sub push-pull signal;
laser intensity detecting means that detects a laser intensity;
offset amount detecting means that detects an offset amount for each of the main push-pull signal, the sub push-pull signal, and the differential push-pull signal; and
adjustment means that adjusts the offset amount on the differential push-pull signal in accordance with a variation of the offset amounts on the main push-pull signal, the sub push-pull signal, and the differential push-pull signal, in relation to the laser intensity;

wherein the laser diode emits the laser light having at least the first laser intensity P1 and the second laser intensity P2 to the optical disc;

wherein the offset amount detecting means detects the offset amount Dof1 on the differential push-pull signal in the first laser intensity P1 based on the reflection from the optical disc, and the offset amount Dof2 on the differential push-pull signal in the second laser intensity P2 based on the reflection from the optical disc; and wherein the adjustment means adjusts the position of the lens such that the offset amount on the differential push-pull signal is present in a predetermined range in a necessary laser intensity for use in at least a reproducing and recording in accordance with a variation of the offset amount on the differential push-pull signal in relation to the variation of the laser intensity derived from the first and second laser intensities P1, P2, and the offset amounts Dof1, Dof2.

11. An optical disc apparatus for recording information on an optical disc, comprising:
a laser diode that emits a laser light;
a lens that focuses the laser light on the optical disc;
lens adjustment means that adjusts a position of the lens;
means that divides the laser light into a main beam and a sub beam;
means that detects the main beam to output a main push-pull signal;
means that detects the sub beam to output a sub push-pull signal;
means that outputs a differential push-pull signal from the main push-pull signal and the sub push-pull signal;
laser intensity detecting means that detects a laser intensity;
offset amount detecting means that detects an offset amount for each of the main push-pull signal, the sub push-pull signal, and the differential push-pull signal; and
adjustment means that adjusts the offset amount on the differential push-pull signal in accordance with a variation of the offset amounts on the main push-pull signal, the sub push-pull signal, and the differential push-pull signal, in relation to the laser intensity;

wherein the laser diode emits the laser light having at least the first laser intensity P1 and the second laser intensity P2 to the optical disc;

wherein the offset amount detecting means detects the offset amount Mof1 on the main push-pull signal and the offset amount Sof1 on the sub push-pull signal in the first laser intensity P1 based on a reflection from the optical disc, and the offset amount Mof2 on the main push-pull signal and the offset amount Sof2 on the sub push-pull signal in the second laser intensity P2 based on a reflection from the optical disc; and wherein the adjustment means varies an amplification degree of the main push-pull signal in accordance with a variation of the offset amounts on the main push-pull signal and the sub push-pull signal in relation to the variation of the laser intensity derived from the first and second laser intensities P1, P2, the offset amounts Mof1, Mof2, and the offset amounts Sof1, Sof2.

12. The apparatus according to claim 11, wherein the main push-pull signal only has a DC offset component.

13. A compensation method of compensating an offset amount on a differential push-pull signal generated on the basis of a main push-pull signal and a sub push-pull signal in a push-pull system for use in an optical disc apparatus, the compensation method comprising the steps of:
emitting a laser light at least at a first laser intensity P1 and a second laser intensity P2;
detecting, by a offset amount detector, an offset amount Mof1 of the main push-pull signal and an offset amount Sof1 of the sub push-pull signal at the first laser intensity P1, and an offset amount Mof2 of the main push-pull signal and an offset amount Sof2 of the sub push-pull signal at the second laser intensity P2; and
determining an amplification degree of a sub push-pull signal which is varied in accordance with a variation of the offset amounts on the main push-pull signal and on the sub push-pull signal in relation to a variation in the laser intensity generated by the first and the second laser intensities P1, P2 and the offset amounts Mof1, Mof2 and Sof1, Sof2.

14. A compensation method of compensating an offset amount on a differential push-pull signal generated on the basis of a main push-pull signal and a sub push-pull signal in a push-pull system for use in an optical disc apparatus, the compensation method comprising the steps of:
emitting a laser light at least at a first laser intensity P1 and a second laser intensity P2;
detecting, by an offset amount detector, an offset amount Mof1 of the main push-pull signal and an offset amount Sof1 of the sub push-pull signal at the first laser intensity P1, and an offset amount Mof2 of the main push-pull signal and an offset amount Sof2 of the sub push-pull signal at the second laser intensity P2; and
adjusting a position of a lens so that a difference between the offset amounts of the main and the sub push-pull signals falls within a predetermined range at a laser intensity necessary for recording and reproducing in accordance with a variation of the offset amounts on the main push-pull signal and on the sub push-pull signal in relation to a variation of the laser intensity generated by the first and the second laser intensities P1, P2 and the offset amounts Mof1, Mof2 and Sof1, Sof2.

* * * * *